Feb. 13, 1968    J. EGGMANN    3,368,851

GAS-LUBRICATED DOUBLE-ACTING AXIAL BEARING

Filed Oct. 22, 1965

INVENTOR.
Jean Eggmann
BY
Pierce Scheffler & Parker
Attorneys

United States Patent Office 3,368,851
Patented Feb. 13, 1968

3,368,851
GAS-LUBRICATED DOUBLE-ACTING
AXIAL BEARING
Jean Eggmann, Baden, Switzerland, assignor to Aktiengesellschaft Brown Boveri & Cie., Baden, Switzerland, a joint-stock company
Filed Oct. 22, 1965, Ser. No. 501,504
Claims priority, application Switzerland, Oct. 28, 1964, 13,936/64
10 Claims. (Cl. 308—9)

ABSTRACT OF THE DISCLOSURE

A gas-lubricated double-acting axial bearing comprises a pair of annular bearing discs secured in parallel spaced relation by means of an annular spacer disc inserted therebetween and to which the bearing discs are secured, the annular spacer disc being secured to the shaft so that it and the parallel spaced bearing discs rotate with the shaft. A non-rotatable, annular bearing disc carried by a universal type mounting is positioned between the rotating annular bearing discs, and the opposite faces of the non-rotatable bearing disc establish gas-lubricated clearance gaps with adjacent faces of the rotating bearing discs. The clearance gaps of the double-acting axial bearing are thus determined by the thickness of the spacer disc and can be adjusted accordingly by changing the thickness of this disc.

---

With rotors which rotate in gas bearings, it is usual to provide an axial bearing which acts only in one direction, due to the difficulties resulting from the precision which is required. An attempt to avoid a movement of the rotor in the opposite direction is made by inclining the axis of the machine in the direction corresponding to the loading of the axial bearing. The load due to the weight components resulting from the machine inclination, should still supply an adequate thrust even when the gas forces disappear, for instance during stillstand, at low speeds, small pressure level, or at an unfavourable operating point.

Experience has shown that is difficult to maintain reliable operation with a one-sided axial bearing unless the operation is restricted. The thrust produced by the gas forces can hardly be determined in advance. Moreover, it varies greatly according to the operating conditions. When the machine axis is vertical, the thrust due to the weight is a maximum and corresponds to the total weight of the rotor. Generally the carrying capacity of the axial bearing at the lowest speed for satisfactory gasdynamic operation is inadequate for the entire rotor weight, so that such machines can hardly be installed in the vertical position.

Operating conditions keep occurring where the rotor wanders away from the axial bearing. Such a condition is naturally not continuously permissible even when a stop is provided which limits the rotor movement, so that no important part is damaged. With gas bearings it is usual that the segments and also complete bearing plates are supported in an adjustable manner. The mass of the movably supported part together with the gas film forms an oscillation system. If the axial bearing is relieved of its load, then the rigidity of the gas film changes until the system is in resonance with the speed frequency and is mainly excited by the slightly irregular rotation of the thrust disc which is certain to occur. These oscillations damage the axial bearing. With whole axial bearing discs, direct metal contact can also occur without resonance when the film is no longer capable of keeping the oscillation amplitude smaller than the bearing clearance.

The present invention concerns an improved form of axial bearing which does not have the aforementioned disadvantages without, however, dispensing with the necessary precision of presenting insurmountable difficulties as regards its fabrication.

The gas-lubricated double-acting axial bearing according to the invention is characterised by the features that a non-rotatable adjustably suspended annular disc is provided which with its supporting surfaces is located between two parallel spaced rotating annular bearing discs which are fixed respectively to the opposite end surfaces of an annular spacing disc attached to the rotor shaft, whereby the clearance gaps of the double-acting axial bearing are established by the thickness of the spacing disc and can be adjusted as necessary simply by changing the thickness of the spacing disc.

Two constructional embodiments of the invention are now explained with the aid of the three views shown in the accompanying drawings wherein.

Figure 1:
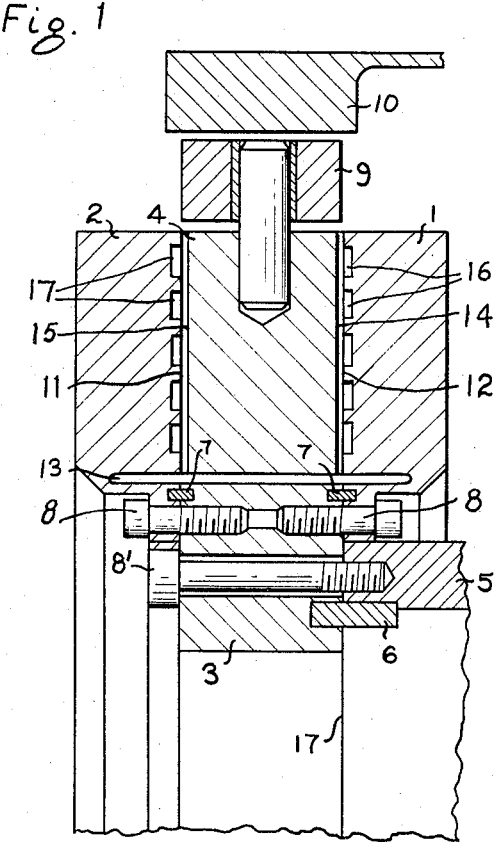
FIG. 1 is a longitudinal sectional view of one embodiment of the invention as applied to a horizontally supported shaft.

FIG. 1 is a sectional view of a double-acting axial bearing with annular, parallel spaced running discs 1, 2 secured by machine screws 8 to opposite sides of an annular spacing disc 3, the spacing disc 3 being in turn secured to shaft 5 by means of machine screws 8′. The spacing disc 3 is centred by means of a ring 6 in the shaft 5, whilst discs 1 and 2 are kept coaxial and centred by means of rings 7 on disc 3. The intermediate rings are so located in the discs, that the centrifugal force increases the fitting pressure. Since the spacing disc 3 has a smaller diameter than the running discs 1 and 2, a U-shaped gap is maintained between these discs in which a non-rotatable axial annular bearing disc 4 is located. The axial bearing disc 4 is fixed to the casing 10 by way of a Cardan joint 9, so that it automatically adjusts its position in a universal manner with respect to the rotating discs 1 and 2.

It is thus possible to obtain in a simple manner a rigid connection between both non-rotating bearing surfaces. Such an arrangement also results in a minimum mass and moreover the moment of inertia on which the reeling motion depends is much smaller than in an arrangement where a stationary disc is located on each side of the rotating collar. For a given film thickness, the natural frequency of the oscillation system will thus be a maximum and have the smallest amplitudes for lower frequencies. The running surfaces 11 and 12 either on the running discs 1, 2 or on both sides of the axial bearing disc 4, can be machined and thus provided with recesses in the form of spiral grooves, pockets, or keys, for the purpose of obtaining the required pressure build-up. In the embodiment illustrated in FIG. 1, these recesses are provided in the faces of the running discs 1 and 2, and are designated 16 and 17 respectively. In the drawings the dimensions of the clearance gaps 14, 15 and recesses 16, 17 have been necessarily exaggerated with respect to the scale utilized for the remainder of the components. Circular recesses 13 extending into the bearing surfaces of the running discs 1 and 2 adjacent their inner periphery enable the running discs to expand freely when subjected to centrifugal forces.

Figure 2:
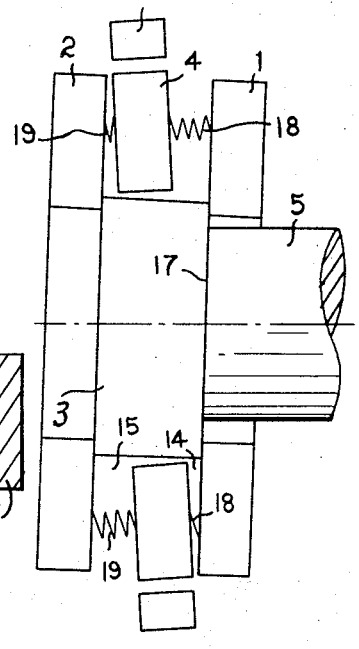
FIG. 2 is a somewhat more schematic view of the improved bearing arrangement depicted in FIG. 1 to better illustrate the manner in which it functions.

FIG. 2 shows how a double-acting axial bearing according to FIG. 1 functions. The operational deviation of disc 3 on shaft 5 and the bearing clearance are shown greatly exaggerated. Those parts which also occur in FIG. 1 are designated by the same numbers. In the gaps 14 and 15 of gas-dynamic bearings, the viscosity forces occuring when one of the surfaces limiting the gas film is machined cause a pressure buid-up due to the rotation of discs 1 and 2 which holds the disc 4 between these discs. Disc 4 is thus forced to follow the uneven rotation of running discs 1, 2 until the natural frequency of oscillation system "disc 4 and gas film left and right" in the bearing gaps 14 and 15 is sufficiently above the speed of shaft 5 and the oscillation amplitude at the extreme outer diameter of disc 4 is less than the smaller running clearance. With a given moment of inertia for the disc and a given gas film rigidity, the magnitude of the oscillation of the stationary disc 4 is still dependent on the deviation from even running. Even running should therefore be aimed at as far as possible. With the construction described, this can easily be achieved by plane grinding the shaft surfaces 17.

High fabrication precision in addition to plane running surfaces is only necessary as regards the bearing surfaces of the non-rotating disc 4 and the end surfaces of spacing disc 3, this being readily achieved by surface grinding and fine polishing. The clearance is determined by the difference in thickness of the spacing disc 3 and the axial bearing disc 4. This can also be easily attained with the necessary tolerances.

With this design the two gas films assist each other as regards the stabilisation of disc 4, because when the bearing clearance is reduced, a corresponding pressure rise occurs in the gas film which tends to increase the clearance and to cause the disc 4 to move parallel to the running surfaces of disc 1 and 2, that is, back to its mid-position.

These forces are symbolized by the springs 18 and 19.

A calculation of the film rigidity for various clearances shows that the resulting rigidity increases with the deviation from the mid-position. This means that the bearing has the smallest stability in the mid-position. It is therefore an advantage when the shape of the running surface is so designed that in this position the individual gas films have optimum rigidity. This is achieved when the depth of the recesses, for example pockets 16, 17 in the supporting surfaces is from one to two and a half times the mean running clearance established by the gaps 14, 15.

In the mid-position, the effects are equal, that is to say twice as great as in a single-acting bearing of the same mass and with the same clearance. The gas films act in opposite directions as regards carrying capacity. The film on the loaded side must absorb the thrust of the rotor and also the force exerted by the second gas film on the disc 4. This decreases, however, as the clearance increases. In other words, when the load increases on the opposite side due to the rotor thrust, it decreases so that the maximum carrying capacity of the axial bearing is only slightly smaller than with a similar one-sided bearing.

The rings 7 for centering the running discs 1 and 2 on the spacing disc 3 would prevent a one-sided expansion due to the centrifugal force and thus cause them to bend on this side. In order to prevent this, the running surface is separated from the bearing surface by the recess 13 so that there is only a thin flexible connection between the outer part of discs 1 and 2 and their supporting flange. The deformation of discs 1 and 2 due to the centrifugal force effect should thus be kept at a minimum.

Figure 3:
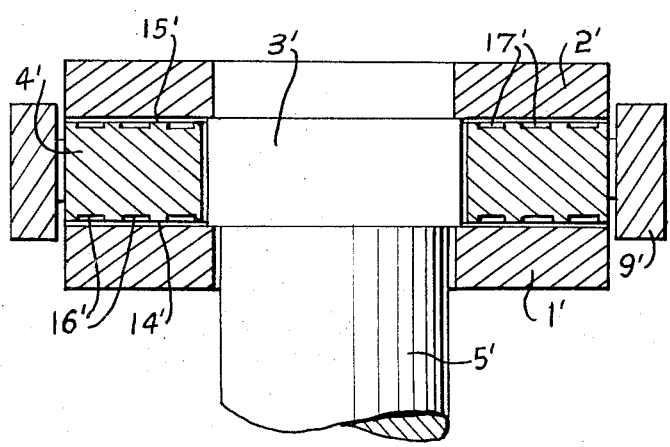
FIG. 3 is a sectional view of a different embodiment of the invention as applied to an upright shaft.

With such an axial bearing, twice as great a thrust variation can be absorbed as with a one-sided bearing, that is from a maximum value in one direction through the unloaded condition up to an equally large thrust in the opposite direction. As proved by calculation, it is possible to maintain the bearing in a stable condition when it is not loaded, that is with a practically negligible thrust, so that the only danger for the bearing is an excessive overload in one or the other direction. If the thrust on the rotor is equalized as far as possible, then the entire supporting capacity is available in both directions as reserve. With this bearing it is also possible to install the machine with horizontal rotor axis. For a vertical installation as depicted in FIG. 3, with the axial bearing at the top or bottom, a double-acting bearing is also an advantage, because experience shows that the rotor shaft 5' can be lifted by the gas forces against its total weight. In this case, by altering the pocket depth in the supporting surfaces it is possible to give the surface subjected to the additional weight of the rotor a greater carrying capacity than the opposite surface, because a change in the pocket depth alters the carrying capacity.

When the bearing is subjected to a definite load, for instance the rotor, it is an advantage to make the machining depth of the pockets in the preloaded bearing surface between a half and once as deep as the pockets in the unloaded supporting surface of the bearing.

FIG. 3 illustrates the construction as described above. In this view those components generally corresponding to those in the embodiment of FIG. 1 have been given corresponding reference numerals but with primes added to those of FIG. 3 for better distinction. Thus the upright shaft 5' is provided with two running discs 1' and 2' located on opposite sides of a non-rotating disc 4' supported in a gimbel mounting 9', the two running discs being spaced from each other by a spacer disc 3'. The running clearance or gap at the upper side of the bearing loaded by the weight of shaft 5', i.e. between the upper side of disc 4' and disc 2' is indicated at 15', and the other running clearance or gap at the lower, unloaded side of the bearing, i.e. between the lower side of disc 4' and disc 1' is indicated at 14'. In this case, the referred to recesses or pockets are provided in opposite faces of the non-rotating disc 4' rather than in the faces of the running discs in accordance with the alternative construction previously referred to, and the depth of the pockets 17' at the upper, loaded side of the bearing is less than the depth of the pockets 16' at the opposite side of the bearing and which is not pre-loaded by the weight of the shaft and the rotor mounted thereon.

I claim:

1. A gas-lubricated, double-acting axial bearing for a rotatable shaft comprising a non-rotatable annular bearing disc, universal mounting means securing said annular bearing disc to a support, a pair of rotatable parallel spaced annular bearing discs establishing running clearance gaps at opposite faces respectively of said non-rotatable bearing disc, an annular spacing disc located radially inward of said non-rotatable annular bearing disc and intermediate said rotatable annular bearing discs, said spacing disc being in surface contact with said rotatable annular bearing discs and determining the axial distance therebetween whereby the thickness of said spacing disc accordingly serves to establish the extent of the running clearance gaps between the surfaces of said non-rotatable and rotatable annular bearing discs, and means securing said rotatable annular bearing discs and said spacing disc to said shaft for rotation therewith.

2. A gas-lubricated double-acting axial shaft bearing as defined in claim 1 wherein said means securing said rotatable annular bearing discs and said annular spacing disc to said shaft are constituted by means securing said rotatable annular bearing discs to said spacing disc, and means securing said spacing disc to said shaft.

3. A gas-lubricated, double-acting axial shaft bearing as defined in claim 1 wherein said rotatable annular bearing discs are secured to said annular spacing disc adjacent the inner periphery of said rotatable annular bearing discs, and wherein said rotatable annular bearing discs are each provided with a circular recess located intermediate the securing means therefor and the running surfaces thereof in contact with said non-rotatable annular bearing disc thereby to permit free expansion of said rotatable annular bearing discs when subjected to centrifugal forces arising from shaft rotation.

4. A gas-lubricated, double-acting axial shaft bearing as defined in claim 1 and which further includes centering rings interconnecting said rotatable annular bearing discs with said annular spacing disc for axially aligning said discs.

5. A gas-lubricated, double-acting axial shaft bearing as defined in claim 4 and which further includes a centering ring interconnecting said annular spacing disc with said shaft for axially aligning said spacing disc and shaft.

6. A gas-lubricated, double-acting axial shaft bearing as defined in claim 1 and wherein recesses are provided at the adjoining faces of said rotating and non-rotating bearing discs at both of said clearance gaps, the depth of the recesses being from one to two and one half times the mean width of said clearance gap.

7. A gas-lubricated, double-acting axial shaft bearing as defined in claim 6 wherein said recesses are provided in the faces of said rotatable bearing discs.

8. A gas-lubricated, double-acting axial shaft bearing as defined in claim 6 wherein said recesses are provided in the opposite faces of said non-rotatable bearing disc.

9. A gas-lubricated, double-acting axial shaft bearing as defined in claim 1 wherein said rotatable shaft is disposed in an upright attitude and wherein said rotatable bearing discs are located at the upper and lower faces respectively of said non-rotatable bearing disc and wherein recesses are provided at the adjoining faces of said rotating and non-rotating bearing discs at both of said clearance gaps, the depth of the recesses correlated to the upper face of said non-rotatable bearing disc which supports the weight of the shaft being from one half to one times the depth of the recesses correlated to the lower face of said non-rotatable bearing disc.

10. A gas-lubricated, double-acting axial shaft bearing as defined in claim 9 wherein said recesses are provided in the upper and lower faces of said non-rotatable bearing disc.

References Cited

UNITED STATES PATENTS

| 2,919,960 | 1/1960 | Whitney | 308—122 |
| 3,189,389 | 6/1965 | Herr | 308—9 |

MARTIN P. SCHWADRON, *Primary Examiner.*

FRANK SUSKO, *Examiner.*